US006466167B1

(12) United States Patent
Steinbrecher

(10) Patent No.: US 6,466,167 B1
(45) Date of Patent: Oct. 15, 2002

(54) ANTENNA SYSTEM AND METHOD FOR OPERATING SAME

(75) Inventor: Donald H. Steinbrecher, Brookline, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/917,586

(22) Filed: Jul. 30, 2001

(51) Int. Cl.[7] .............................. G01S 3/16; G01S 3/28
(52) U.S. Cl. ....................................... 342/378; 342/372
(58) Field of Search ................................. 342/378, 372

(56) References Cited

U.S. PATENT DOCUMENTS 6,313,789 B1 * 11/2001 Zhodzishsky et al. . 342/357.12

* cited by examiner

*Primary Examiner*—Theodore M. Blum
(74) *Attorney, Agent, or Firm*—Michael J. McGowan; Michael F. Oglo; James M. Kasischke

(57) ABSTRACT

An antenna apparatus (and corresponding innate method) comprises an array of antenna elements each having a phase center. An "observable signal" that contains a low-frequency component and a high-frequency component is generated. The high-frequency component is summed with the signal received by each antenna element near its phase center, forming a plurality of sum signals. These are fed into a signal processing arrangement that processes these signals with the low frequency component of the observable signal, including analog to digital conversion to (i) remove the high frequency component of the observable signal, (ii) normalize the effects of the signal transfer characteristics on the digital sum signals, (iii) synchronously re-sample the digital sum signals, and (iv) differentially time-reference each digital sum signal to the phase center of the corresponding antenna element. The thusly, processed digital signals are combined into a single composite signal.

15 Claims, 2 Drawing Sheets

ANTENNA SYSTEM AND METHOD FOR OPERATING SAME

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field Of The Invention

The present invention generally relates to antenna systems.

(2) Description of Prior Art

Prior art antenna systems comprise a plurality of antenna elements that receive electromagnetic waves incident on the antenna elements. The dynamic range of the amplitudes of such electromagnetic waves is relatively large. The electromagnetic waves may emanate from a plurality of sources that may be non-cooperative thereby making it difficult, if not impossible, for the antenna system to effect a favorable dynamic range of incident electromagnetic waves. The aforementioned prior art antenna systems typically comprise analog signal paths or channels between the antenna elements and other signal processing components. Such analog signal paths may effect particular signal processing functions such as filtering, frequency or phase shifting, amplification, etc. However, the dynamic-range limitations of these analog signal paths can cause deleterious effects on the received signals. Furthermore, the dynamic range of the analog signal channels cannot be easily or inexpensively increased because the overall dynamic range of analog signal path depends on the tolerance and operational limitations of the individual analog signal components within the analog signal path.

Simultaneous multi-functional antenna use may be implemented by means of a wide-band digital interface that permits high spurious-free dynamic range digital (i) analysis of received signals, or (ii) synthesis of transmitted signals. Wide-band analog signal processing components are incapable of achieving the same levels of high spurious-free dynamic range operation as digital signal processing objects. Furthermore, it is unlikely that the linearity of essential analog components will ever increase substantially. This is because component linearity is intimately linked to basic semiconductor physics. However, high spurious-free dynamic range is essential for wide-band multi-functional operation.

When the dynamic range of amplitudes of the incident electromagnetic waves cover a relatively large dynamic range of amplitudes, one or more of the electromagnetic waves may be lost as a result of the non-linearity of the analog signal paths. Intermodulation distortion, weak-signal suppression, spurious-response generation, and other performance-limiting effects may occur when a combination of strong and weak signals are present simultaneously in a non-linear part of an analog signal path. This dynamic-range problem is often referred to as the "near-far" problem that arises when signals arriving from a "near" source and a "far" source differ significantly in amplitude and must be processed by the same system.

What is needed is an antenna system that has a relatively improved spurious free dynamic range.

SUMMARY OF THE INVENTION

Therefore, it is an object of the present invention to circumvent the inadequate linearity of analog components and to provide an antenna system that addresses the foregoing problems.

It is another object of the present invention to eliminate adjustable phase shifters and attenuators on the antenna elements so as to stabilize the reflection coefficient of the antenna array over time and improves the stealth quality of the receiving system to electromagnetic probes, e.g., radar.

It is a further object of the present invention to introduce a locally generated wide-band signal observable into the phase center of each antenna element wherein the observable is used in the digital domain to facilitate a continuous calibration of the transfer function of each and every analog signal path of each antenna element so that coherent digital combining may take place in the absence of a desired signal.

Another object of the present invention is provide an antenna system that can provide stealth characteristics while providing a wide-band receiving capability in which multiple, simultaneous, individual beams can be formed using true time delay for each signal of interest in the wide band of operation.

It is a further object of the present invention to provide an antenna system that has a relatively high spurious-free dynamic range so as to provide the ability to simultaneously receive and process signals of widely differing amplitudes and bandwidths and improves resistance to jamming.

It is another object of the present invention to provide an antenna system that is relatively more stable over time in comparison to analog components and processes of conventional antenna systems which may be sensitive to temperature and component aging.

It is a further object of the present invention to provide an antenna system that exhibits improved reliability and life-cycle cost in comparison to conventional systems.

Other objects and advantages of the present invention will be apparent to one of ordinary skill in the art in light of the ensuing description of the present invention.

The present invention is directed to an antenna system that utilizes a wide-band observable signal to time-tag arriving signals at the phase center of each element of a multi-element antenna array in such a manner that the true time of arrival of these signals becomes a part of the digital representation of each signal sample. In accordance with the present invention, the antenna system of the present invention utilizes a locally generated observable signal that provides timing and other information useful for coherently combining signal components received independently at different antenna elements. Specifically, the observable signal is used to quantify the time-varying differential delay associated with each analog signal path between the phase center of each antenna element and a corresponding analog-to-digital converter. The observable signal is added to the analog signal path of each antenna element near the phase center of the antenna and is sampled with the unknown signal by the analog-to-digital converter associated with the analog signal path. The observable signal is constructed so that it can be separated from the unknown signal by correlation with a replica in order to characterize the transfer function associated with each analog signal path. Thus, the observable signal provides information about the receiving system that allows a digital signal processor to coherently and constructively combine signal components that are received by independent antenna elements.

In one aspect, the present invention is directed to a method of processing signals received by an antenna system comprising an array of antenna elements for receiving signals. Each antenna element has a phase center. The method comprises the steps of (a) generating an observable signal that contains a low-frequency component and a high-frequency component, (b) summing the high-frequency component with the signal received by each antenna element near the phase center of each antenna element to form a plurality of sum signals, (c) feeding each sum signal into an analog signal path that modifies the sum signal, (d) converting each modified sum signal into a digital sum signal, (e) processing the digital sum signals with the low frequency component of the observable signal to (i) remove the high frequency component of the observable signal, (ii) normalize the effects of the signal transfer characteristics of the analog signal paths on the digital sum signals, (iii) synchronously re-sample all digital sum signals and (iv) differentially time-reference the digital sum signals to the phase center of the corresponding antenna elements so as to provide a plurality of processed digital signals wherein each processed digital signal is a low-frequency replica of the signal received by a corresponding antenna element, and (f) combining the processed digital signals into a single composite signal.

In a related aspect, the present invention is directed to an antenna system, comprising (a) an array of antenna elements for receiving signals, each antenna element having a phase center, (b) a circuit for generating an observable signal that contains a low-frequency component and a high-frequency component, (c) a plurality of signal processing channels, each channel comprising an input for receiving a signal received from a corresponding antenna element, a summing circuit located at each element near the phase center of the corresponding antenna element for summing the high-frequency component of the observable signal with the received signal to form a sum signal, an analog signal path for modifying the sum signal, an analog-to-digital converter for converting each modified sum signal into a digital sum signal, and a digital signal processor having inputs for receiving the digital sum signal and the low-frequency component, the digital signal processor configured to (i) remove the high frequency component from the digital sum signal, (ii) normalize the effects of the signal transfer characteristics of the analog signal path on the digital sum signal, (iii) re-sample the digital sum signal synchronously with the digital signal processors of the other signal processing channels, and (iv), differentially time-reference each re-sampled digital sum signal to the phase center of the corresponding antenna elements so as to provide a processed digital sum signal that is a low-frequency replica of the signal received by the corresponding antenna element, (d) a control circuit for effecting synchronous operation of the digital signal processors of the signal processing channels, and (e) a system digital signal processor for combining the processed digital sum signals outputted by the signal processing channels into a single composite signal.

BRIEF DESCRIPTION OF THE DRAWINGS

The features of the invention are believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT

In describing the preferred embodiments of the present invention, reference will be made herein to FIGS. 1 and 2, in which like numerals refer to like features of the invention.

Figure 1:
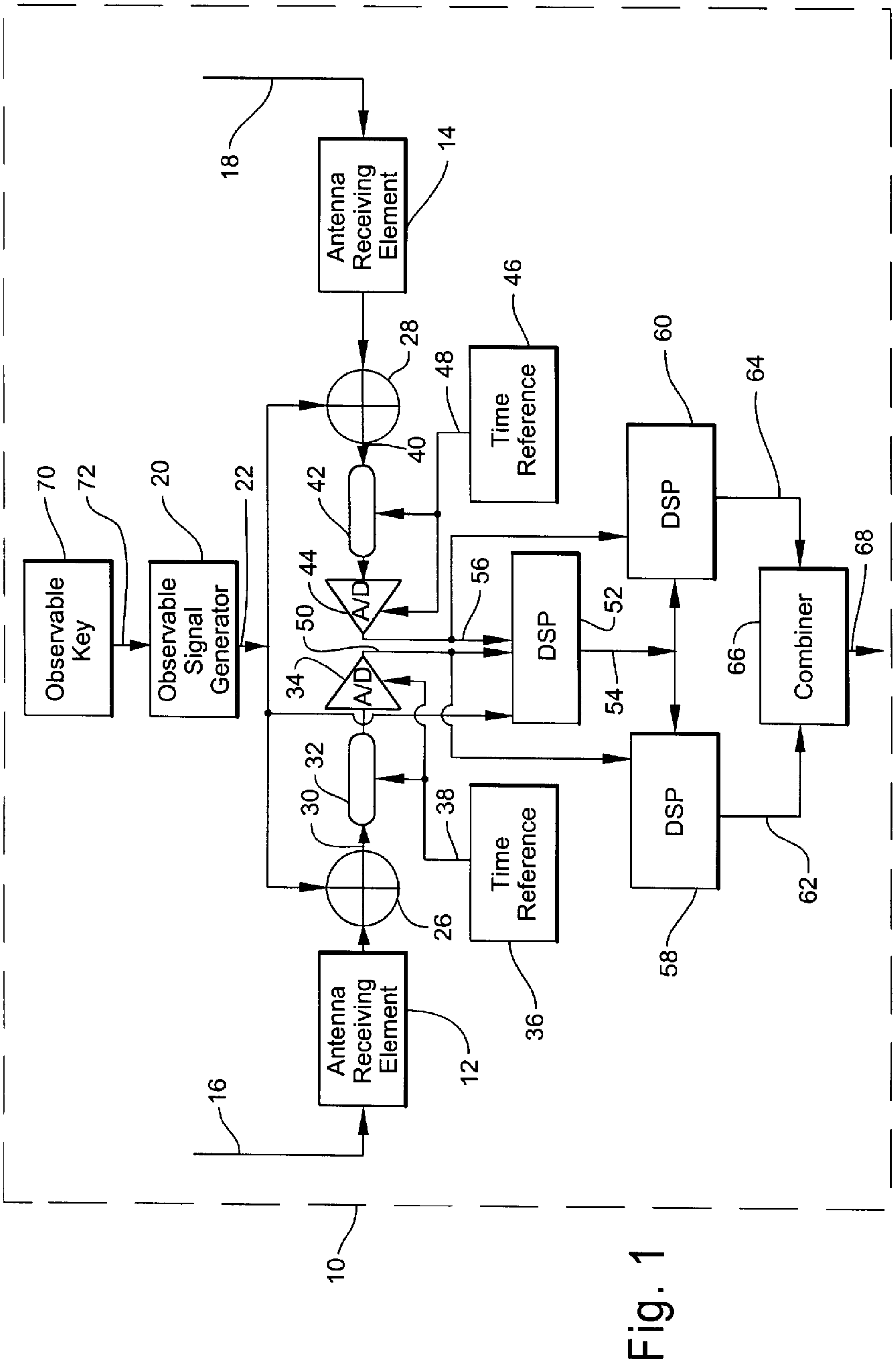
FIG. 1 is a block diagram of one embodiment the antenna system of the present invention.

Referring to FIG. 1, there is shown one embodiment of the antenna system of the present invention. Antenna system 10 generally comprises antenna elements 12 and 14. However, it is to be understood that antenna system 10 can comprise less or more than two antenna elements. Incoming signal 16 arrives at the phase center of antenna element 12. Similarly, incoming signal 18 arrives at the phase center of antenna element 14. Signals 16 and 18 originate from one or more common sources. Antenna system 10 further comprises signal generator 20 that generates signal 22 that comprises an observable signal having a predetermined frequency spectrum. The term "observable" as used herein is defined as a signal whose properties can be used to observe and quantify the effects of a complex signal path on an unknown signal. Signal 20 further comprises a low-frequency component that is a replica of the observable signal and a high-frequency component that is a replica of the observable signal. The high frequency component has a frequency that is in the frequency band of signals 16 and 18. In one embodiment, signal generator 20 is configured to utilize the signal-processing function known as "aliasing" to produce the high frequency and low frequency replicas of the observable signal.

Signal 22 is inputted into summing circuit 26 wherein the high-frequency replica of the observable signal is summed with incoming signal 16 near the phase center of antenna element 12. Similarly, signal 22 is inputted into summing circuit 28 wherein the high-frequency replica of the observable signal is summed with incoming signal 18 near the phase center of antenna element 12. The signal paths between signal generator 20 and summing circuit 26 and between signal generator 20 and summing circuit 28 have known and stable time delay characteristics. Summing circuits 26 and 28 are located near the phase centers of antenna elements 12 and 14, respectively.

Referring to FIG. 1, summing circuit 26 outputs sum signal 30 which is the sum of incoming signal 16 and the high-frequency component of signal 22. Signal 30 passes through signal path 32. Signal path 32 may be complex and configured to implement such functions as filtering, frequency or phase shifting, amplification, etc. Signal path 32 is coupled to the input of analog-to-digital circuit ("ADC") 34. Antenna system 10 further includes time reference circuit 36 which generates time reference signal 38 that is inputted into the appropriate components of signal path 32 and ADC 34. The sampling frequency of ADC 34 may be the same or different than the frequency of time reference signal 38.

Similarly, summing circuit 28 outputs sum signal 40 which is the sum of incoming signal 18 and signal 22. Signal 40 passes through signal path 42. Signal path 42 may be complex and configured to implement such functions as filtering, frequency or phase shifting, and amplification. Signal path 42 is coupled to the input of analog-to-digital converter ("ADC") 44. Antenna system 10 further includes time reference circuit 46 which generates a time reference signal 48 that is inputted into the appropriate components of signal path 42 and ADC 44. The sampling frequency of ADC 44 may be the same or different than the frequency of time reference signal 48.

Time reference circuits 36 and 46 may be realized by a microprocessor, computer or other timing circuitry, and may or may not be synchronized.

In a preferred embodiment, signal path 32 and ADC 34 exhibit a relatively high degree of linearity at the frequency and amplitude of signal 30. Similarly, signal path 42 and ADC 44 exhibit a relatively high degree of linearity at the frequency and amplitude of signal 40. The relatively high degree of linearity substantially reduces distortion created by the non-linear properties of signal paths 32, 42 and A/D converters 34, 44 to a level that is below the noise level in the output signal of antenna system 10 (i.e., signal 68 described in the ensuing description). The signal paths 32 and 42 may be configured so that their functions (e.g., filtering, frequency shifting, and amplification) are either different or substantially identical.

Referring to FIG. 1, ADC 34 outputs a multi-bit digital sum signal 50 which is inputted into digital signal processor ("DSP") 52. DSP 52 is configured to perform correlation functions as well as other signal processing functions such as Fast Fourier Transforms, Discrete Fourier Transforms and interpolation. DSP 52 compares signal 50 with the low-frequency component of signal 22 in order to determine the signal transfer characteristics (i.e., transfer function) of analog signal path 32. Similarly, ADC 44 outputs a multi-bit digital sum signal 56 which is inputted into digital signal processor ("DSP") 52. DSP 52 compares signal 56 with the low-frequency replica component of signal 24 in order to determine the signal transfer characteristics (i.e., transfer function) of analog signal path 42. DSP 52 outputs processed signal 54 which is then inputted into digital signal processors DSPs 58 and 60.

Referring to FIG. 1, digital sum signal 50 is also inputted into DSP 58. DSP 58 processes signal 50 so as to remove signal 22 and the effects of the signal transfer characteristics of signal path 32. DSP 58 also re-samples signal 50. DSP 58 outputs signal 62 which is a low-frequency replica of received signal 16 and is differentially time-referenced to the phase center of antenna element 12. Similarly, digital sum signal 56 is also inputted into DSP 60. DSP 60 processes signal 56 so as to remove observable signal 22 and the effects of the signal transfer characteristics of signal path 42. DSP 60 also re-samples signal 56. In a preferred embodiment, the operation of DSPs 58 and 60 are synchronized so that digital sum signals 50 and 56 are synchronously re-sampled. DSP 60 outputs signal 64 which is a low-frequency replica of received signal 18 and is differentially-time referenced to the phase center of antenna receiving element 14. Thus, signals 62 and 64 constitute sampled low-frequency replicas of the analog high-frequency received signals 16 and 18, respectively, and contain the information content of signals 16 and 18, respectively. Signals 62 and 64 are inputted into combiner 66 which constructively combines signals 62 and 64 to form signal 68 which constitutes the output signal of antenna system 10. The phrase "constructively combined" as used herein refers to the manner in which the instantaneous signal voltages are added together such that the power of a combined signal from two independent antenna elements 12 and 14 is greater than the power of one of the signals 16 and 18 by a factor of four. Thus, if equal-amplitude signals from N receiving antenna elements are constructively combined, the signal voltage increases by a factor of N and the signal power increases by a factor of $N^2$.

Signals 62 and 64 have generally the same amplitude. When signals 62 and 64 are constructively combined by combiner 68, the signal power of signal 68 increases by a factor of four while the noise power of signal 68 increases by a factor of two. Thus, the signal-to-noise ratio of signal 68 increases by a factor of two. Thus, if N signals are constructively combined by combiner 66, the signal-to-noise ratio of signal 68 improves by a factor of N.

Independent signals 62 and 64 contain all information necessary to enable combiner 66 to effect a correct signal-combining process. Signals 62 and 64 are not time sensitive. Thus, signals 62 and 64 can be transmitted from DSP 58 and DSP 60 to combiner 66 via a network without network latency having any adverse effect on the signal-combining process implemented by combiner 66.

In an alternate embodiment, antenna system 10 includes observable signal conditioning circuit 70 which may be used in determining the differential time of arrival of signals 16 and 18 at the phase centers of antenna receiving elements 12 and 14, respectively. Specifically, circuit 70 conditions signal generator 20 such that signals 62 and 64 contain special information that defines the positions of the phase centers of antenna receiving elements 12 and 14. In one embodiment, circuit 70 is configured as a GPS ("Global Positioning System") receiver which outputs received signal 72. Signal 72 is inputted into signal generator 20. As a result, signals 62 and 64 contain specific time and position information relating to the phase centers of antenna receiving elements 12 and 14. Then, outputs from a plurality of systems 10 may be constructively combined, even if the systems 10 are moving relative to one another, providing only that the plurality of systems 10 can observe the same GPS constellation.

Figure 2:
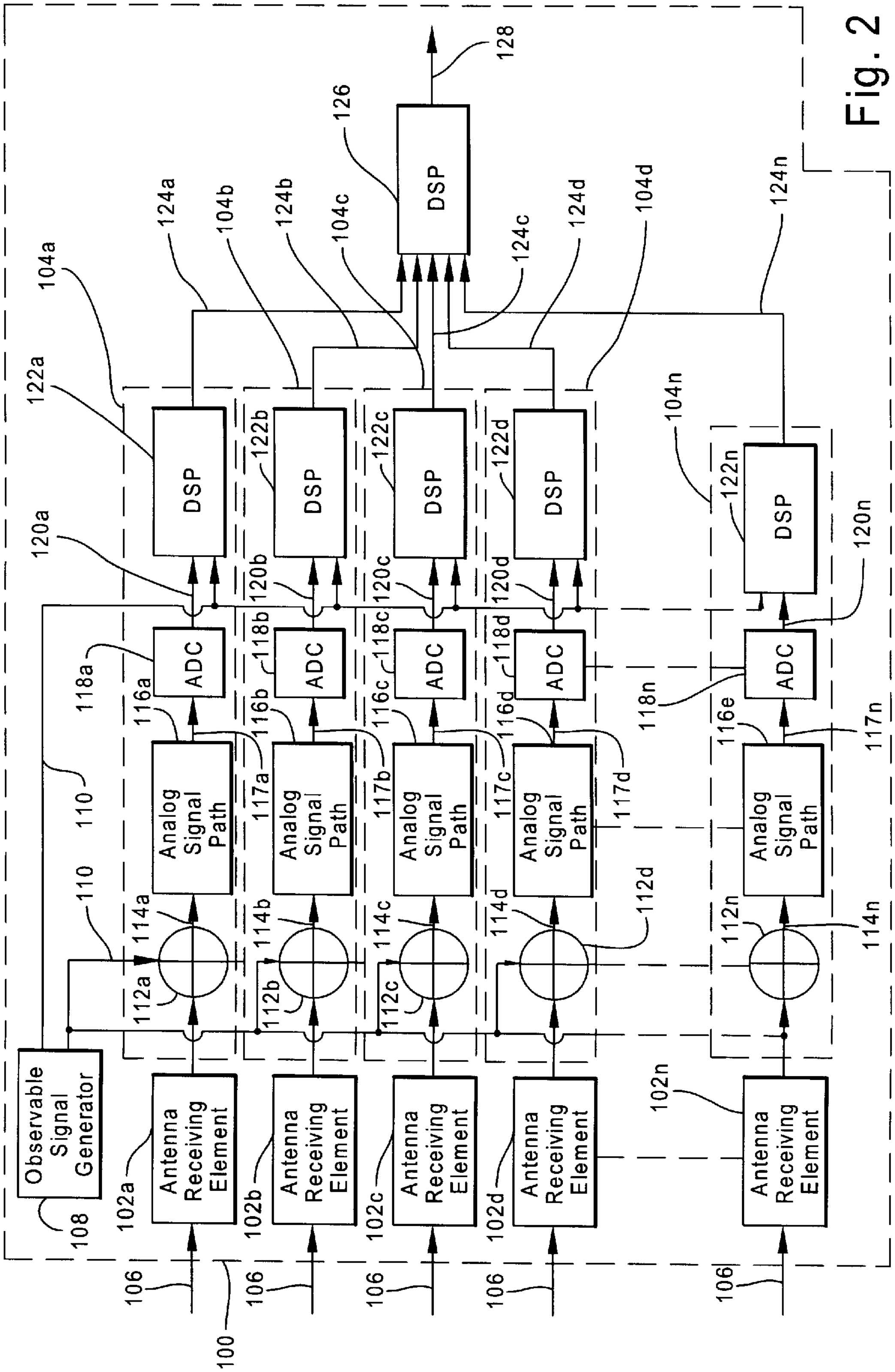
FIG. 2 is a block diagram of another embodiment of the antenna system of the present invention.

Referring to FIG. 2, there is shown an alternate embodiment of the antenna system of the present invention. Antenna system 100 comprises a plurality of antenna elements 102*a*–102*n* and a plurality of corresponding signal processing channels 104*a*–104*n*, respectively. Signals or electromagnetic waves 106 arrive from one or more directions and are incident on antenna elements 102*a*–102*n*. Each signal 106 has a different time of arrival at the phase center of its corresponding antenna element. Antenna elements 102*a*–102*n* and signal processing channels 104*a*–104*n* cooperate to digitize and process signals 106 in such a manner that the dynamic range of signals 106 is preserved. These features are discussed in detail in the ensuing description.

Referring to FIG. 2, signals 106 are converted to electrical signals by antenna elements 102*a*–102*n*. The magnitudes of the voltage and current defining a signal 106 received by an antenna element depend on the capture area of the antenna element that faces in the direction of propagation of signal 106 as well as the power density of signal 106 at the plane of the antenna element. The term "capture area" as used herein is defined as a frequency-dependent directional quantity proportional to the product of the antenna directional gain and the square of the electromagnetic wavelength. The power of the received signal 106 is the product of the capture area and the incident-wave power density. The total signal power received by n identical antenna elements 102*a*–102*n* in a uniform electromagnetic field is n-times the power received by one antenna element since the capture area increases linearly with the number of antenna elements. In order to recover the total signal power, it is necessary to constructively add the n signals 106 received by each antenna element 102*a*–102*n*.

Referring to FIG. 2, antenna system 100 further comprises observable signal generator 108 that generates signal 110 that comprises an observable signal having a predetermined frequency, a low-frequency component that is a replica of the observable signal, and a high-frequency component that is a replica of observable signal. The high frequency component is in the frequency band of signals 106. In one embodiment, observable signal generator 108 is configured as observable signal generator 20 used in antenna system 10.

Referring to FIG. 2, each signal processing channel 104*a*–104*n* includes summing networks 112*a*–112*n*, respectively, that correspond and are coupled to antenna elements 102*a*–102*n*, respectively. Summing networks 112*a*–112*n* are located near the phase center of each antenna element 102*a*–102*n*, respectively. Signal 110 is inputted into each of the summing networks 112*a*–112*n* wherein it is summed with a corresponding signal 106 near the phase center of each antenna element 102*a*–102*n*. In a preferred embodiment, the signal path between observable signal generator 108 and each summing circuit 112*a*–112*n* has known and stable time delay characteristics.

Referring to FIG. 2, each summing network 112*a*–112*n* output signals 114*a*–114*n*, respectively. Each signal 114*a*–114*n* is the sum of a corresponding signal 106 and signal 110. Channels 104*a*–104*n* further include analog signal paths 116*a*–116*n*, respectively. Signals 114*a*–114*n* pass through corresponding analog signal paths 116*a*–116*n*, respectively. Each analog signal path 116*a*–116*n* may be complex and configured to implement such functions as filtering, frequency or phase shifting, and amplification. Signal 110 is used to continuously provide information about analog signal paths 116*a*–116*n* that may be used to faithfully reconstruct received signals 106 in the other signal processing stages of channels 104*a*–104*n* that are explained in the ensuing description. What emerges as an output from each analog signal path 116*a*–116*n* is a corresponding one of signals 117*a*–117*n*, respectively.

Each channel 104*a*–104*n* further includes analog-to-digital converters ("ADC") 118*a*–118*n*, respectively. Signals 117*a*–117*n* are inputted into ADCs 118*a*–118*n*, respectively. ADCs 118*a*–118*n* sample signals 117*a*–117*n* and quantify these signals into digital data streams 120*a*–120*n*, respectively. Each ADC 118*a*–118*n* may sample at a different sampling rate as long as each sampling rate satisfies the Nyquist sampling criteria.

As the signals 106 are processed by summing networks 112*a*–112*n*, analog signal paths 116*a*–116*n* and ADCs 118*a*–118*n*, the characteristics (e.g., amplitude, phase, frequency, delay, etc.) of signals 106 are modified. Thus, in accordance with the present invention, channels 104*a*–104*n* further include digital signal processor ("DSP") 122*a*–122*n*, respectively. Each DSP 122*a*–122*n* includes an input for receiving digital signals 120*a*–120*n*, respectively, and an input for receiving signal 110. DSPs 122*a*–122*n* normalize the modified signal characteristics introduced by the other components in channels 104*a*–104*n*, respectively, as well as the corresponding antenna element 102*a*–102*n*, respectively. Each DSP 122*a*–122*n* also delays each signal 120*a*–120*n*, respectively, by the appropriate delay time to compensate for the difference in arrival time at the phase centers of antenna elements 102*a*–102*n*, respectively. Specifically, information derived from signal 110 is used by each DSP 122*a*–122*n* to normalize each signal 120*a*–120*n*, respectively, to the relative amplitude and relative phase of the signal component when it was at the phase center of the associated antenna element. The normalization process requires that a uniform time delay be introduced across all channels 104*a*–104*n*. DSPs 122*a*–122*n* output digitally processed signals 124*a*–124*n*, respectively, that are inputted into DSP 126.

The digital signal processing functions provided by each DSP 122*a*–122*n* are synchronous across all channels 104*a*–104*n* so that all signals 124*a*–124*n*, respectively, have an identical time reference. A computer, microprocessor or other type of controlling device can be used to synchronously control DSPs 122*a*–122*n*. In one embodiment, DSPs 122*a*–122*n* are configured to effect digital signal processing techniques known as "re-sampling" and "interpolation" to create the time synchronous sequences of samples 124*a*–124*n*. In such a configuration, each sample is assigned a sequence number from a set of sequence numbers that is relatively large compared to any network delays that may be encountered between the DSPs 122*a*–122*n* and DSP 126. Then, the samples of each signal processing channel 104*a*–104*n* having a particular sequence number q assigned thereto will be normalized in amplitude and phase and reassembled at a later time into a sample of the composite signal that is simultaneously received by all antenna elements.

Referring to FIG. 2, DSP 126 is configured to perform a process known as "beam forming" on the digitally processed signals 124*a*–124*n* outputted by DSPs 122*a*–122*n*, respectively. The beam forming process involves assigning a set of weights and time delays to signals 106 so that a signal arriving from a particular direction is favored or emphasized in the summation process performed by DSP 126. In such a configuration, DSP 126 imposes channel weights and time delays on signals 124*a*–124*n* (i.e., the individual signal components). DSP 126 then sums signals 124*a*–124*n* to form a beam favoring or emphasizing the direction of arrival of one of signals 106 incident on one of antenna elements 102*a*–102*n*. DSP 126 then outputs signal 128 that is comprised of the total signal received from one direction of arrival. In an alternate embodiment, a plurality of DSPs similar to DSP 126 are used to form beams in other directions.

A wide-band complex signal may be divided among N parallel channels in many ways to increase spurious-free dynamic range. The present invention embodies this principle by densely populating an antenna-array area with a plurality of electrically small antenna elements, each of which having a capture area so small that the connected signal-path components will not exhibit system-degrading non-linearity in an operational environment. Furthermore, in this embodiment, a separate digital interface is provided for the wide-band signal path of each antenna element. High spurious-free dynamic range is achieved by coherently combining the plurality of wide-band signals in the digital domain.

As the capture area associated with each signal channel is decreased, the number of channels is proportionately increased so that the total capture are remains constant. Thus, each channel signal-to-noise ratio is proportionately decreased and it becomes more and more difficult to coherently combine the signals from a plurality of channels in the digital domain. In accordance with the present invention, this difficulty is overcome by introducing a locally generated wide-band signal observable into the phase center of each antenna element. The observable is used in the digital domain to facilitate a continuous calibration of the transfer function of each and every channel so that coherent digital combining may take place even in the absence of a desired signal. The process is loosely analogous to holography in that the incident electromagnetic wave front is combined with a locally generated reference wave and then sampled in space and time.

The time delay between each DSP 122*a*–122*n* and DSP 126 may be different for each channel. However, the difference in delay times does not affect the accuracy of information recovery but only affects the latency of the process. Thus, the links between each DSP 122*a*–122*n* and DSP 126 may be established over a network of any extent, such as the Internet.

An important feature of antenna system 100 is that the dynamic range of the digitally processed signal 128 is limited only by digital word length, i.e., the number of valid bits in the digital signal outputted by the digital signal processors.

The dynamic range requirement for each channel 104*a*–104*n* is based on the maximum signal voltage and current received by an antenna element 102*a*–120*n*. In a uniform electromagnetic field, the product of the maximum signal voltage and current are proportional to the capture area of the antenna element. Once signals 124*a*–124*n* are summed or combined in DSP 126, the product of the maximum signal voltage and current is proportional to the total capture area summed over all antenna elements 102*a*–102*n*. If the number of antenna elements is increased while the total capture area remains constant, then output signal 128 remains constant while the required dynamic range of each channel 104*a*–104*n* can be reduced in inverse proportion to the number of antenna elements.

Additionally, the spurious-free dynamic range of signal 128 may be equal to or greater than "n" times greater than the dynamic range of signal 117*a*–117*n* outputted by analog signal paths 116*a*–116*n*, respectively ("n" refers to the quantity of antenna elements for the case of identical channels). The dynamic range of antenna system 100 can achieve the afore said extraordinary spurious-free dynamic range because the dynamic range of DSP 126 is limited only by numeric precision.

In an alternate embodiment, ADCs 118*a*–118*n*, DSPs 122*a*–122*n* and DSP 126 are configured to digitally implement 24-bit mantissa arithmetic. As a result of such a configuration, the dynamic range of antenna system 100 increases to more than 120 dB. Increasing the precision of the digital arithmetic will further increase the dynamic range of antenna system 100.

Thus, antenna systems 10 and 100 provide a novel way to increase the spurious-free dynamic range of a receiving system that comprises an array of antenna elements capable of forming multiple beams, a plurality of signal processing channels that convert analog received information to periodic digital samples, and a digital signal processor that combines the samples to construct a digital replica of the analog signal appearing at or near the phase-center of each antenna element. The increased spurious-free dynamic range eliminates the need for narrow-band RF filters and allows the antenna array to operated with relatively wider frequency bands. The ability to construct a digital replica of the analog signal components at the phase center of each antenna element permits beam forming in the digital domain without the need for adjustable analog phase shifters and analog amplitude controls on the antenna elements. Elimination of adjustable phase shifters and attenuators on the antenna elements stabilizes the reflection coefficient of the antenna array over time and improves the stealth quality of the receiving system to electromagnetic probes, e.g., radar.

The generation and utilization of the observable signal provides many important advantages. The observable signal is combined with the signal received by each antenna at or near the phase center of the antenna. The observable signal is constructed digitally such that replicas exist at baseband and at the received RF frequency of the antenna element. As a result of using this observable signal, the relative time of arrival at each antenna element is established across all elements of the array. Therefore, it is not necessary to synchronize the analog-to-digital conversion sampling process in the independent channels. Thus, each ADC may operate at a different sample frequency provided only that the Nyquist criteria is met in each channel.

Since the observable signal is combined with signals 106 at or near the antenna phase center, the differential latency among the individual signal channels will not materially affect the accuracy of DSP 126 even if the differential latency is time dependent. Once in the digital domain, controlled differential latency may be introduced independently for each received signal, channel by channel, to provide true time-delay beam forming for each received signal. As a result, antenna systems 10 and 100 are suitable for receiving relatively large bandwidth signals, e.g., spread-spectrum signals.

Antenna systems 10 and 100 provide stealth characteristics while providing a wide-band receiving capability in which multiple, simultaneous, individual beams can be formed using true time delay for each signal of interest in the wide band of operation. The relatively high spurious-free dynamic range of antenna systems 10 and 100 provide the ability to simultaneously receive and process signals of widely differing amplitudes and bandwidths and improves resistance to jamming. Antenna systems 10 and 100 may be configured using monolithic analog-RF and digital components developed for commercial wireless applications. Furthermore, antenna systems 10 and 100 are relatively more stable over time whereas the analog components and processes of conventional antenna systems may be sensitive to temperature and component aging. Thus, antenna systems 10 and 100 exhibit improved reliability and life-cycle cost in comparison to conventional systems. Antenna systems 10 and 100 can be used in a wide variety of communications and surveillance applications.

Antenna systems 10 and 100 may be used with a central computer, microprocessor or other controller to synchronize all signal processing functions. A conventional personal computer or computer work station with sufficient memory and processing capability may be used as the central computer. Specifically, the central computer must be capable of high volume transaction processing, performing a significant number of mathematical calculations and processing functions.

Simultaneous multi-functional antenna use may be implemented by means of a wide-band digital interface that permits high spurious-free dynamic range digital (i) analysis of received signals, or (ii) synthesis of transmitted signals. Wide-band analog signal processing components are incapable of achieving the same levels of high spurious-free dynamic range operation as digital signal processing objects. Further, it is unlikely that the linearity of essential analog components will ever increase substantially. This is because component linearity is intimately linked to basic semiconductor physics. Since high spurious-free dynamic range is essential for wide-band multi-functional operation, in accordance with the present invention, there is provided a way to overcome the inadequate linearity of the essential analog components in the signal path between the air interface and the digital interface of the wide-band multi-functional antenna system.

The present invention also provides a way to circumvent the inadequate linearity of essential analog components by replacing a single analog channel with a plurality of analog channels operating in parallel. When a wide-band complex signal is divided among N parallel channels, the spurious-free dynamic range is improved by $10\times\log_{10}(N)$ dB.

Further, in accordance with the invention, a wide-band complex signal may be divided among N parallel channels in many ways to increase spurious-free dynamic range. The invention embodies this principle by densely populating an antenna array area with a plurality of electrically small antenna elements. Each of these small antenna elements has a capture area so small that the connected signal-path components will not exhibit system-degrading non-linearity in an operational environment. Further, in this embodiment, a separate digital interface is provided for the wide-band signal path of each antenna element. High spurious-free dynamic range is achieved by coherently combining the plurality of wide-band signals in the digital domain. As the capture area associated with each signal channel is decreased, the number of channels is proportionately increased so that the total capture area remains constant. Thus, each channel signal-to-noise ratio is proportionately decreased and it becomes more and more difficult to coherently combine the signals from a plurality of channels in the digital domain. In accordance with the present invention, this difficulty is overcome by introducing a locally generated wide-band signal observable into the phase center of each antenna element. The observable is used in the digital domain to facilitate a continuous calibration of the transfer function of each and every channel so that coherent digital combining may take place in the absence of a desired signal. The process is loosely the electromagnetic analog to holography in that the incident electromagnetic wave front is combined with a locally generated reference wave and then sampled in space and time.

It is a further feature of the invention that the locally generated observable can be keyed to Global Positioning System signals to provide position and time-of-arrival information. Then, it becomes possible to coherently combine the "holographic" information gathered at a plurality of locations having a view of the same GPS constellation.

It is to be appreciated that the invention offers an opportunity to significantly increase the bandwidth and signal-handling capability of wide aperture radio-frequency antenna arrays and to employ the advantageous high spurious-free dynamic range capabilities of digital signal processing in the analysis and synthesis of radio frequency signals. Parallel digital signal processing objects may be used to simultaneously enable many functions connected to the same radio-frequency interface. Further, the dense phased array antenna system provides direct network access to specific segments of the RF spectrum thereby offering the opportunity to add wireless links to network-centric connections.

The present invention can be embodied in the form of computer processor readable program code embodied in a computer processor usable medium, such as floppy diskettes, CD-ROMs, hard drives, or any other computer-readable storage medium, wherein, when the computer program code is loaded into and executed by a computer, the computer becomes an integral part of an apparatus or system for practicing the invention.

The principals, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and/or changes may be made by those skilled in the art without departing from the spirit of the invention. Accordingly, the foregoing detailed description should be considered exemplary in nature and not limited to the scope and spirit of the invention as set forth in the attached claims.

What is claimed is:

1. A method for processing electromagnetic signals impinging on a given area comprising the steps of:

providing an antenna system comprising an array of antenna elements spatially distributed over said given area for providing received signals, each antenna element having a phase center;

generating an observable signal that contains a low-frequency component and a high-frequency component;

summing the high-frequency component with the signal received by each antenna element near the phase center of each antenna element to form a plurality of sum signals;

feeding each sum signal into an analog signal path that modifies the sum signal;

converting each modified sum signal into a digital sum signal;

processing the digital sum signals with the low frequency component of the observable signal to (i) remove the high frequency component of the observable signal from each digital sum signal, (ii) normalize the effects of the signal transfer characteristics of the analog signal paths on each digital sum signal, (iii) synchronously re-sample all digital sum signals, and (iv) differentially time-reference each digital sum signal to the phase center of the corresponding elements so as to provide a plurality of processed digital signals wherein each processed digital signal is a low-frequency replica of the signal received by the corresponding antenna element; and combining the processed digital signals into a single composite signal;

to thereby enhance the spurious-free dynamic range of the array.

2. The method according to claim 1 wherein the generating step comprises the step of performing an aliasing function on the observable signal to produce the low and high frequency components.

3. The method according to claim 1 wherein the processing step further comprises the step of determining the differential time of arrival of each received signal at the phase center of the corresponding antenna element.

4. The method according to claim 1 wherein in the processing step, each digital sum signal is normalized to the relative amplitude and relative phase of the corresponding received signal when such received signal was at the phase center of the corresponding antenna element.

5. The method according to claim 4 wherein the normalizing step further includes the step of delaying each digital sum signal by a uniform time delay.

6. The method according to claim 1 wherein the combining step comprises the step of forming a beam emphasizing the direction of arrival of one of the signals incident on one of the antenna elements so that the composite signal represents the total signal received from the emphasized direction of arrival.

7. An antenna system for capturing electromagnetic radiation impinging upon a given area, comprising:

an array of antenna elements for receiving signals, each antenna element having a capture area such that the sum of the capture areas of the elements is generally equal to said given area, each antenna element having a phase center;

a circuit for generating an observable signal that contains a low-frequency component and a high-frequency component;

a plurality of signal processing channels, each channel comprising an input for receiving a signal received from a corresponding antenna element, a summing circuit located at each element near the phase center of the corresponding antenna element for summing the high-frequency component of the observable signal with the received signal to form a sum signal, an analog signal path for modifying the sum signal, an analog-to-digital converter for converting each modified sum signal into a digital sum signal, and a digital signal processor having inputs for receiving the digital sum signal and the low-frequency component, the digital signal processor configured to (i) remove the high frequency component from the digital sum signal, (ii) normalize the effects of the signal transfer characteristics of the analog signal paths on the digital sum signal, (iii) re-sample the digital sum signal synchronously with the digital signal processors of the other signal processing channels, and (iv) differentially time-reference each re-sampled digital sum signal to the phase center of the corresponding antenna elements so as to provide a processed digital sum signal that is a low-frequency replica of the signal received by the corresponding antenna element;

a control circuit for effecting synchronous operation of the digital signal processors of the signal processing channels; and a system digital signal processor for combining the processed digital sum signal outputted by each signal processing channel into a single composite signal.

8. The antenna system according to claim 7 wherein the control circuit is in electronic data communication with the analog-to-digital converter and digital signal processor of each signal processing channel so as to synchronize the functions of the analog-to-digital converters and digital signal processors.

9. The antenna system according to claim 8 wherein the control circuit comprises a computer.

10. The antenna system according to claim 7 wherein the circuit for generating the observable signal comprises a frequency synthesizer.

11. The antenna system according to claim 7 wherein the circuit for generating the observable signal generator is configured to implement an aliasing function on the observable signal so as to produce the low and high frequency components.

12. The antenna system according to claim 7 wherein the digital signal processor of each channel includes means for determining the differential time of arrival of the signals at the phase centers of each antenna element.

13. The antenna system according to claim 7 wherein the digital signal processor of each signal processing channel includes means for delaying each digital sum signal by a uniform time delay.

14. The antenna system according to claim 7 wherein the system digital signal processor is configured to form a beam emphasizing the direction of arrival of a particular one of the signals incident on one of the antenna elements so that the composite signal represents the total signal arriving from the emphasized direction of arrival.

15. An article of manufacture comprising a computer processor usable medium having computer processor readable program code embodied therein for processing signals received from an antenna system that comprises an array of antenna elements for receiving signals wherein each antenna has a phase center, a circuit for generating an observable signal that contains a low-frequency component and a high-frequency component, a plurality of signal processing channels wherein each channel comprises an input for receiving a signal received from a corresponding antenna, a summing circuit located element near the phase center of the corresponding antenna, an analog signal path for modifying the sum signal, an analog-to-digital converter, a digital signal processor having inputs for receiving the digital sum signal and the low-frequency component, the antenna system further comprising a control circuit for synchronously controlling the digital signal processor of each signal processing channel, and a system digital signal processor having a plurality of inputs wherein each input is connected to the output of a corresponding signal processing channel, the computer processor readable program code in the article of manufacture comprising:

computer processor readable program code configured to cause the antenna system to enable the circuit to generate the observable signal;

computer processor readable program code configured to cause the antenna system to enable each summing circuit to sum the high-frequency component of the observable signal with a received signal to form a sum signal;

computer processor readable program code configured to cause the antenna system to enable the analog signal path of each channel to modify the sum signal to produce a modified sum signal;

computer processor readable program code configured to cause the antenna system to enable the analog-to-digital-converter to convert each modified sum signal into a digital sum signal;

computer processor readable program code configured to cause the antenna system to enable the digital signal processor of each channel to (i) remove the high frequency component from the digital sum signal, (ii) normalize the effects of the signal transfer characteristics of the analog signal path on the digital sum signal, (iii) re-sample the digital sum signal synchronously with the digital signal processors of the other signal processing channels, and (iv) differentially time-reference each re-sampled digital sum signal to the phase center of the corresponding antenna elements so as to provide a processed digital sum signal that is a low-frequency replica of the signal received by the corresponding antenna element; and computer processor readable program code configured to cause the antenna system to enable the system digital signal processor to combine all of the processed digital signals into a composite signal.

* * * * *